(12) United States Patent
Allevi et al.

(10) Patent No.: US 7,946,627 B2
(45) Date of Patent: May 24, 2011

(54) FEMALE QUICK COUPLING FITTING ELEMENT FOR PIPES

(75) Inventors: Matteo Allevi, Misano Gera D'Adda (IT); Gianmarco Gatti, Pognano (IT); Giovanni Stucchi, Treviglio (IT); Sergio Tivelli, Cividate Al Piano (IT)

(73) Assignee: Stucchi S.p.A., Brignano Gera D'Adda (BG) (IT)

( * ) Notice: Subject to any disclaimer, the term of this patent is extended or adjusted under 35 U.S.C. 154(b) by 229 days.

(21) Appl. No.: 11/989,693

(22) PCT Filed: Jul. 31, 2006

(86) PCT No.: PCT/EP2006/064873
§ 371 (c)(1),
(2), (4) Date: Mar. 19, 2009

(87) PCT Pub. No.: WO2007/014944
PCT Pub. Date: Feb. 8, 2007

(65) Prior Publication Data
US 2009/0315325 A1    Dec. 24, 2009

(30) Foreign Application Priority Data
Aug. 3, 2005   (IT) .............................. MI2005A1521

(51) Int. Cl.
*F16L 17/00* (2006.01)

(52) U.S. Cl. ..................... 285/101; 285/386; 137/614.02
(58) Field of Classification Search .................. 285/101, 285/103, 386, 316, 277; 137/614.02, 614.03
See application file for complete search history.

(56) References Cited

U.S. PATENT DOCUMENTS
3,446,245 A * 5/1969 Snyder, Jr. ............... 137/614.03
(Continued)

FOREIGN PATENT DOCUMENTS
EP    0 542 342    5/1993
(Continued)

OTHER PUBLICATIONS
International Search Report issued Nov. 24, 2006 in the International (PCT) Application of which the present application is the U.S. National Stage.

(Continued)

*Primary Examiner* — David E Bochna
(74) *Attorney, Agent, or Firm* — Wenderoth, Lind & Ponack, L.L.P.

(57) ABSTRACT

A female element (1) includes a hollow internal body (2) having an end (3) provided with fastening device (5) to one of the pipes to be joined, a hollow external body (7) coaxial with the internal body (2) and having an end (8) which axially protrudes with respect to another end (4) of the internal body (2) opposite to that provided with the fastening device (5), one rigid central stem (9) coaxially supported by the internal body (2) by a transversal perforated base (18) and having a widened end (10) near the protruding end (8) of the external body (7), an axially sliding sealing bush (12) coaxially arranged about the stem (9) and elastically stressed to be engaged with the widened end (10) of the stem (9) to prevent the passage of fluid within the female element (1), a cleaning bush (14) coaxially arranged about the sealing bush (12) and axially stressed in position so as to prevent the entrance of dirt about the sealing bush (12) and a lock sleeve (16) arranged about the protruding end (8) of the external body (7) and engageable with a complementary end of a male element to ensure the stable union of the two male and female elements of the fitting. The stem (9) is fixed to the base (18) by at least one half bush (25) radially fitted and axially locked in corresponding seats (26, 27) of the stem (9) and the base (18).

4 Claims, 1 Drawing Sheet

U.S. PATENT DOCUMENTS

| | | | |
|---|---|---|---|
| 3,727,952 A * | 4/1973 | Richardson | 285/101 |
| 4,098,292 A * | 7/1978 | Evans | 137/614.04 |
| 5,123,446 A * | 6/1992 | Haunhorst et al. | 137/614.02 |
| 5,873,386 A * | 2/1999 | Arosio | 137/614.02 |
| 6,158,717 A * | 12/2000 | Van Scyoc et al. | 137/614.02 |
| 6,328,348 B1 * | 12/2001 | Cornford et al. | 285/316 |
| 7,661,724 B2 * | 2/2010 | Arosio | 285/316 |

FOREIGN PATENT DOCUMENTS

| | | |
|---|---|---|
| EP | 0 580 233 | 1/1994 |
| EP | 0 862 010 | 9/1998 |

OTHER PUBLICATIONS

Patent Cooperation Treaty (PCT) Written Opinion of the International Searching Authority, issued Nov. 24, 2006 in International Application No. PCT/EP2006/064873.

* cited by examiner

FEMALE QUICK COUPLING FITTING ELEMENT FOR PIPES

BACKGROUND OF THE INVENTION

1. Technical Field

The present invention relates to a female quick coupling fitting element for pipes.

For the transmission of fluids, fittings which may be rapidly reciprocally coupled to connect rigid or flexible pipes, in turn connected to a fluid feed or user, must frequently be used.

2. Description of the Related Art

The known quick coupling fittings usually consist of two elements, called male and female, which are fastened to respective pipes to be joined and which can be reciprocally coupled by screwing or snapping.

According to a currently known technique, the female element comprises an internal hollow body with an end provided with fastening means to one of the pipes to be joined and to a hollow external body that is coaxial with the internal body and having an end which axially protrudes with respect to the other end of the internal body opposite to that provided with fastening means.

The internal body coaxially supports a rigid central stem having a widened end near the protruding end of the external body. With the widened end, a sealing bush axially sliding and coaxially arranged about the stem is elastically stressed to engage to prevent the passage of fluid within the female element.

An elastically stressed cleaning bush is coaxially arranged about the sealing bush to prevent the entrance of dirt about the sealing bush.

Finally, a sliding or turning sleeve is envisaged about the protruding end of the external body which is snappingly engageable or screwed with a complementary end of the male element to ensure the stable union of the two male and female elements of the fitting.

For supporting and fastening the stem to the internal body of the female element, a transversal base is provided in some known fittings with circumferentially arranged shaped holes axially and radially locked by mechanical stops made between the fastening nut and the corresponding end of the internal body. The stem is fixed to the base by means of a terminal thread which passes through the base and a lock nut placed on the opposite side of the base itself.

An example of a fitting of this type is described in EP-A-0 542 342.

In this fitting, the stem must withstand the hydraulic pressure possibly existing within the female element and the elastic action exerted by the sealing bush of the female element, as well as the elastic force exerted, with elements coupled, by the springs of the male element. It may thus occur in time that the threaded fastening of the stem to the base may slacken and the lock nut may slip off, entering into circulation in the hydraulic system to which the fitting belongs.

SUMMARY OF THE INVENTION

In view of this prior art, the object of the present invention is to make a female quick coupling fitting element for pipes envisaging a more precise, stable and safe positioning of the central stem.

According to the present invention, this object is reached by a female element comprising a hollow internal body having an end provided with fastening means to one of the pipes to be joined, a coaxial hollow external body with the internal body and having an end which axially protrudes with respect to another end of the internal body opposite to that provided with fastening means, one rigid central stem coaxially supported by the internal body by means of a transversal perforated base and having a widened end near the protruding end of the external body, an axially sliding sealing bush coaxially arranged about the stem and elastically stressed to engage with the widened end of the stem to prevent the passage of fluid within the female element, a cleaning bush coaxially arranged about the sealing bush and axially stressed in position so as to prevent the entrance of dirt about the sealing bush and a lock sleeve arranged about the protruding end of the external body and engageable with a complementary end of a male element to ensure the stable union of the two male and female elements of the fitting. The stem is fixed to the base by means of at least one half bush radially and axially locked in corresponding seats of the stem and the base.

In the female element according to the invention, the central stem is therefore no longer fastened to the base by means of a threaded end and lock nut, but it is instead firmly locked with respect to it by means of one or more half bushes which in turn cannot move from the seats intended for them.

The lock nut can neither slacken nor get lost, and at the same time assembly and disassembly is easier.

BRIEF DESCRIPTION OF THE DRAWINGS

The features of the present invention will be made more apparent by the following detailed description of a non-limitative example of a female element shown in the accompanying drawings, in which.

DETAILED DESCRIPTION OF THE INVENTION

Figure 1:
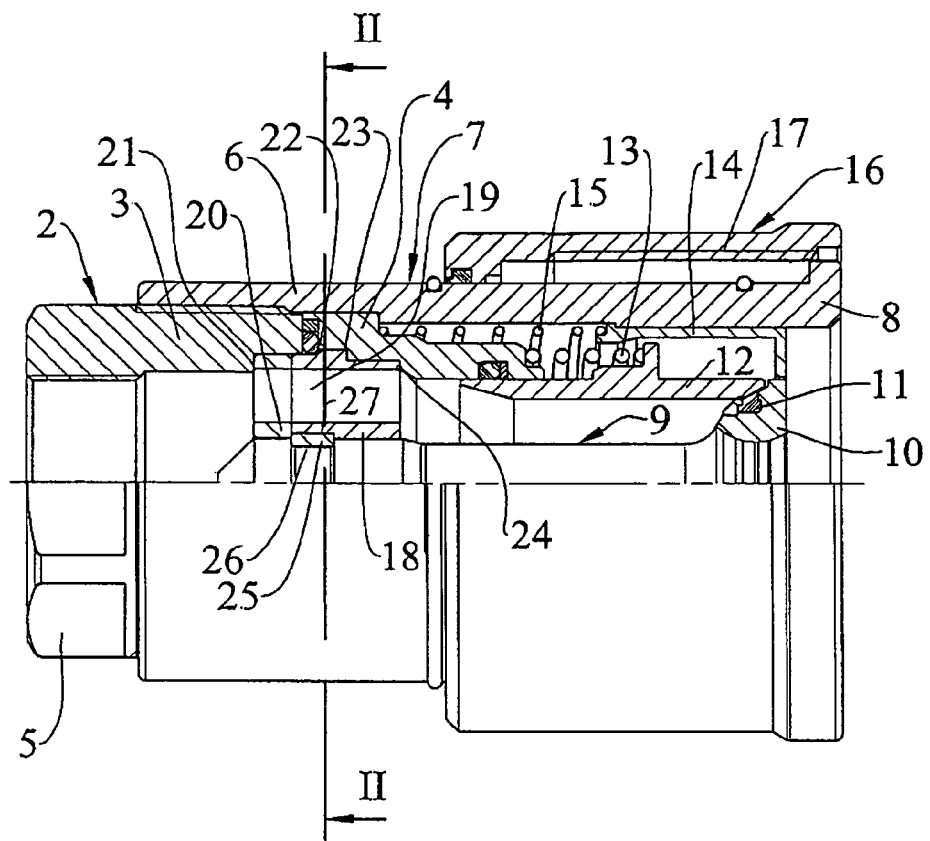
FIG. 1 shows a female fitting element according to the present invention, partially in side view and partially in longitudinal section.

FIG. 1 shows a female pipe fitting element, which is indicated as a whole by number 1 and comprises a hollow internal body 2 made of two parts 3 and 4, the first of which ends with a threaded nut 5 suitable for fastening the female element 1 to one of the pipes to be joined.

On part 3 of the internal body 2 an end 6 of an external hollow body 7 is screwed, coaxial with the internal body, whose other end 8 axially protrudes with respect to part 4 of internal body 2.

Internal body 2 coaxially supports a rigid central stem 9 having a widened end 10 with seal 11 near the protruding end 8 from the external body 7.

A sealing bush 12 is coaxially arranged, in an axially sliding manner, about stem 9 and is stressed by a spring 13 to engage with seal 11 of widened end 10 of the stem itself to prevent the passage of fluid to or from within the female element 1.

A cleaning bush 14 under the bias of a spring 15 is coaxially arranged about sealing bush 12 to prevent the entrance of dirt about the sealing bush.

About end 8 of external body 7 a lock sleeve 16 is turningly and slidingly arranged, whose internal threading 17 is engageable with a corresponding external threading of the external body of a male element to lock the two elements together and to allow an internal body of the male element to push the sealing bush 12 backwards and open communication between the internal passages of the male and female elements.

An example of such screw coupling is described and illustrated in EP-A-0 580 233.

Figure 2:
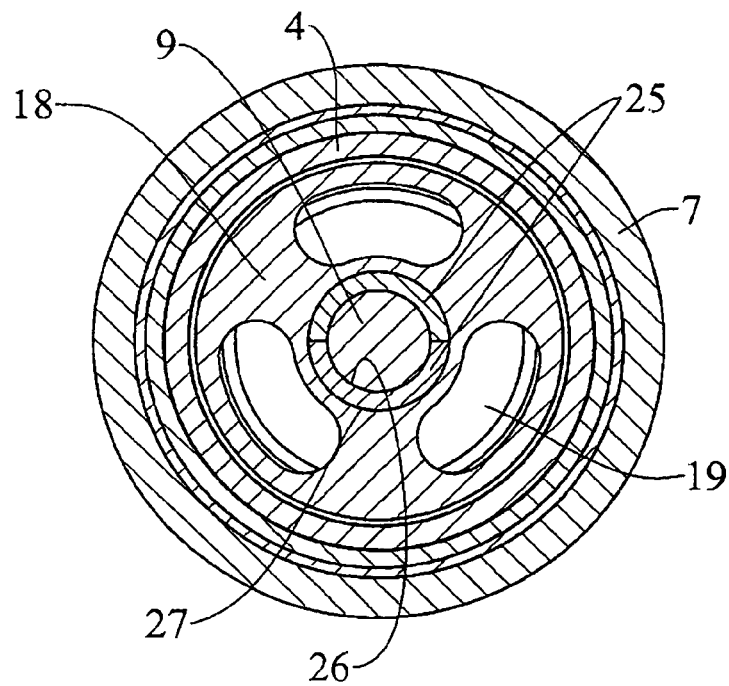
FIG. 2 shows a cross-section of the female element taken along line II in FIG. 1.

The support and the fastening of stem 9 within internal body 2 is obtained by means of a transversal base 18 (FIG. 2) which is crossed by circumferentially arranged shaped holes 19 and axially and radially locked by a similarly perforated plate 20 and by mechanical stops 21, 22, 23 and 24 made in parts 3 and 4 of the internal body 2. Two half bushes 25 (FIG. 2) are interposed and locked with two facing concavities between the stem 9 and the base 18 within respective seats 26 and 27. Plate 20 prevents any movement of the two half bushes 25 and bottom 19, and consequently of step 9.

The invention claimed is:

1. A female element comprising:
   a hollow internal body having a first end and a second end, said first end being provided with fastening means for fastening to a pipe to be joined another to pipe;
   a hollow external body coaxial with said hollow internal body and having a protruding end that axially protrudes with respect to the second end of said hollow internal body, the second end of said hollow internal body being opposite with respect to the first end of said hollow internal body;
   a rigid central stem coaxially supported by said hollow internal body by means of a transversal perforated base, said rigid central stem having a widened end near the protruding end of said hollow external body;
   an axially sliding sealing bush coaxially arranged about said rigid central stem and elastically stressed to be engaged with the widened end of said rigid central stem to prevent fluid from passing within the female element;
   a cleaning bush coaxially arranged about said axially sliding sealing bush and axially stressed in position so as to prevent dirt from entering about said axially sliding sealing bush; and
   a lock sleeve arranged about the protruding end of said hollow external body and engageable with a complementary end of a male element to ensure a stable union of the female element with the male element, wherein said rigid central stem is fixed to said transversal perforated base by means of at least one half bush that is radially fitted and axially locked in corresponding seats of said rigid central stem and said transversal perforated base.

2. A female element according to claim 1, further comprising a perforated plate arranged between said transversal perforated base, said at least one half bush and a mechanical stop of said hollow internal body to axially lock in position said transversal perforated base and said at least one half bush.

3. A female element according to claim 2, wherein said at least one half bush comprises two facing half bushes.

4. A female element according to claim 1, wherein said at least one half bush comprises two facing half bushes.

* * * * *